United States Patent [19]

Acker et al.

[11] 4,298,832
[45] Nov. 3, 1981

[54] DIGITAL MOTOR SPEED CONTROLLER

[75] Inventors: Robert H. Acker, Packanack Lake; William C. Wessling, Sparta; Arnold J. Brand, Parsippany; Bob N. Naydan, Wyckoff, all of N.J.

[73] Assignee: The Singer Company, Little Falls, N.J.

[21] Appl. No.: 130,279

[22] Filed: Mar. 14, 1980

[51] Int. Cl.³ .............................................. H02P 5/16
[52] U.S. Cl. .................... 318/318; 318/314; 318/341
[58] Field of Search ........................ 314/318, 314, 341

[56] References Cited

U.S. PATENT DOCUMENTS

| | | | |
|---|---|---|---|
| 3,646,417 | 2/1972 | Cassie et al. | 318/318 |
| 3,836,756 | 9/1974 | Yammoto et al. | 318/608 |
| 3,838,325 | 9/1974 | Kobayashi et al. | 318/318 |
| 3,950,682 | 4/1976 | Dohanich, Jr. | 318/314 |

FOREIGN PATENT DOCUMENTS 2015201  5/1979  United Kingdom ............... 318/318

*Primary Examiner*—David Smith, Jr.
*Attorney, Agent, or Firm*—Morris Liss; Thomas W. Kennedy

[57] ABSTRACT

A switching circuit turns on at the beginning of a first clock signal and turns off in response to a gyroscope shaft detector signal. During the time the switching circuit remains on, a counter counts the cycles of a second clock signal. This resultant count is employed as an error signal for adjusting the output frequency of a pulse generator which is connected to a gyroscope motor. A feedback loop is created between the aforementioned components for achieving a preselected constant gyroscope motor speed.

5 Claims, 3 Drawing Figures

DIGITAL MOTOR SPEED CONTROLLER

FIELD OF THE INVENTION

The present invention relates to motor speed control systems and more particularly to a digital control system adapted for maintaining constant gyroscope motor speed.

BRIEF DESCRIPTION OF THE PRIOR ART

The precise control of the speed of a two-axis gyroscope flywheel is necessary to provide precision data. It has been determined that gyroscope drift performance can be optimized by synchronizing the flywheel position in a repeatable orientation with respect to a reference in order to eliminate the random effects of stray magnetic fields, vibration, side pull and isoelastic effects due to motor vibration which are associated with a random synchronization "lock-in" angle. This latter-mentioned angle may be defined as the angle between the leading edge of a gyroscope motor energizing signal and a gyroscope shaft pickup signal.

Various approaches have been developed for driving the gyroscope motor of a two-axis gyroscope, including the utilization of an induction motor drive and a closed loop servo-mechanism which controls both the gyroscope speed and the "lock-in" angle. Certain prior art schemes have required the inclusion of demodulation, shaping, analog-to-digital conversion and power buffering. Although this mentioned prior art approach has improved the speed control of a gyroscope, a major limitation resides in the generation of synchronous harmonic frequency modulating drive signals which are impressed on the motor through supply voltage ripple and grounding effects in the analog and analog-digital conversion sections of a required servo-mechanism. These frequency modulation effects in turn create large drift rectifications when operating in synchronous fashion through the kinematics of a tuned motor hinge mechanism often used in a two-axis gyroscope.

BRIEF DESCRIPTION OF THE PRESENT INVENTION

The present invention provides an all digital gyroscope motor speed control system which precisely controls speed and also synchronizes the flywheel with respect to a reference clock while eliminating the major mechanism for the creation of frequency modulation effects at harmonics of wheel speed.

In addition, the digital implementaton of the present invention enables the realization of a more reliable circuit, utilizing integrated ciruits which render the attendant benefit of lower power dissipation than analog-based prior art.

It should be understood that, although the speed control system is described in conjunction with a gyroscope motor, it has application to other types of motors as well.

The above-mentioned objects and advantages of the present invention will be more clearly understood when considered in conjunction with the accompanying drawings, in which:

DETAILED DESCRIPTION OF THE INVENTION

Figure 1:
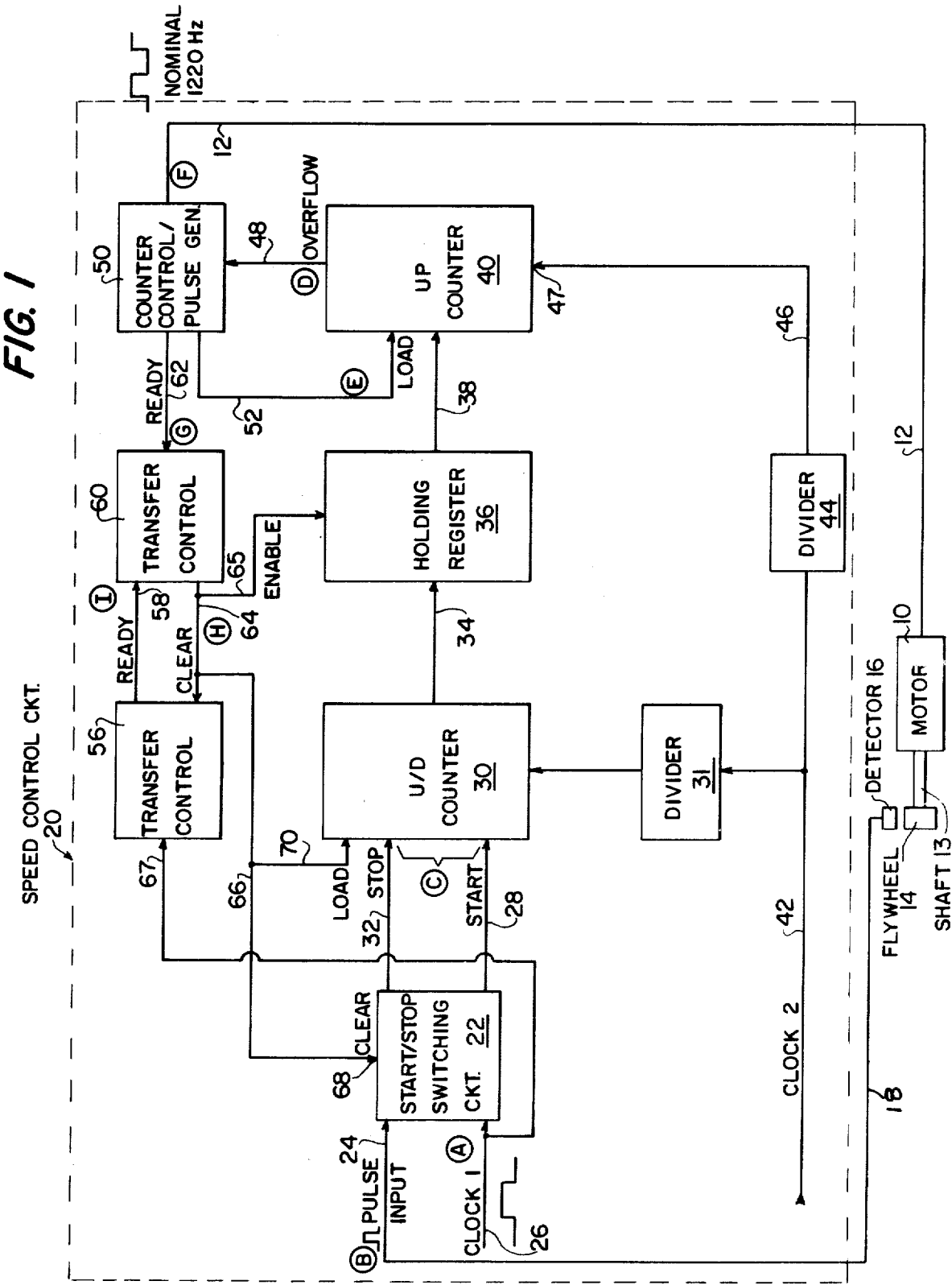
FIG. 1 is a block diagram of the present motor speed control system.
Figure 3:
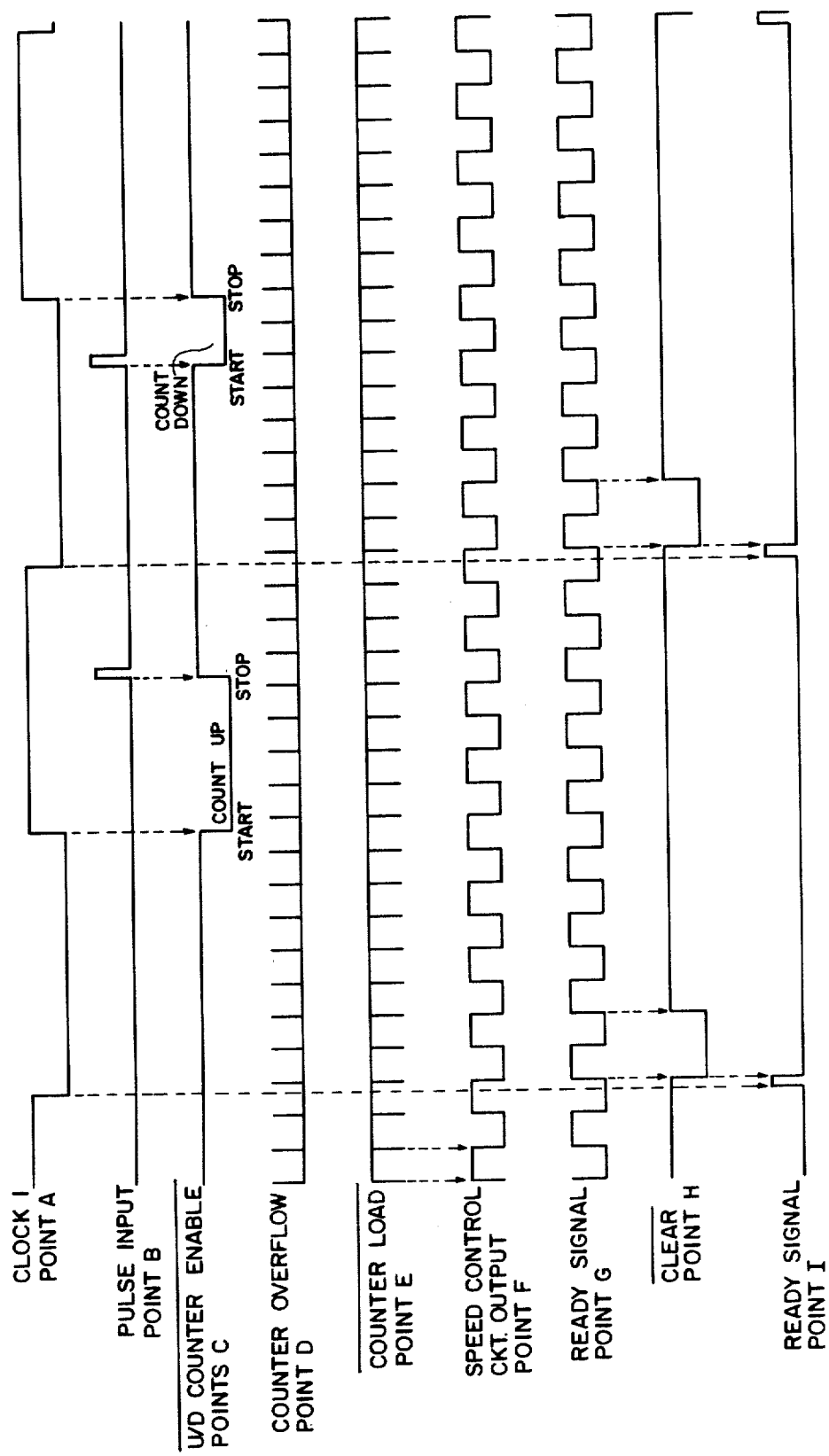
FIG. 3 is a timing diagram showing signals at various points in the circuitry of the control system.

Referring to the figures, FIG. 1 illustrates a block diagram of the present motor speed control system. A motor 10, which may be a gyroscope motor, has a lead 12 connected to the input thereof for energizing the motor. An output motor shaft 13 is illustrated as having a flywheel 14 connected thereto. The shaft or flywheel may have a magnetic element or integrally formed structure (not shown) incorporated therein so that a magnetic detector 16 is capable of detecting each revolution of the shaft 13. Of course, optical detection or similar shaft pick-up devices may also be utilized as is well known by those skilled in the art. Each revolution of the motor shaft will cause the generation of a pulse along detector lead 18 and provides a first input to the circuitry of the inventive speed control circuit which is indicated at 20. The speed control circuit 20 develops a squarewave output which is used to control the speed of motor 10. The circuit output at lead 12 is a squarewave with a nominal frequency plus or minus an amount proportional to the difference in time between the rising edge of a clock reference squarewave and the occurrence of a pulse from detector 16. The pulse from the detector is a feedback signal which occurs once per revolution of the motor shaft 13. When this pulse from the detector occurs at a same rate as the clock reference, the motor speed has been properly synchronized. A difference between the clock reference input and detector pulse rates produces an output frequency change which ultimately provides rate correction for maintaining constant motor speed. In the event the motor 10 is that of a two-axis gyroscope, the inventive circuitry 20 optimizes drift performance by synchronizing the flywheel position in a repeatable orientation with respect to the clock reference. It should be pointed out that in the following description of the invention, certain circuit points are denoted by an alphabetical letter which relates to the timing diagram of FIG. 3.

In further consideration of circuit 20, the pulse input signal appearing along lead 18 is fed to a first terminal 24 (Point B) of a start/stop switching circuit 22. A clock signal is provided along lead 26 to a second input (Point A) of the circuit 22. In a typical application of the present invention for a two-axis gyroscope, the clock signal may be 150 Hz. The leading edge of a clock signal turns the switching circuit 22 on thereby producing a "Start" signal along lead 28 (Point C), which is connected to the first input of a 12-bit up/down counter 30. A pulse input present at 24 will generate a "Stop" signal at output lead 32 (Point C) which stops the counter 30 from counting. A second clock is provided along lead 42, the second clock having a frequency different from the first. In the application of the present invention to a two-axis gyroscope motor, the second clock may have a frequency of 9.8 MHz. while the first clock is 150 Hz. The clock signal is fed to a frequency divider 31, which is designed to generate a pulse train having a frequency which is approximately three orders of magnitude higher than the first clock signal. In the application for a two-axis motor gyroscope, such a frequency may typically be 154 KHz. resulting from a "divider-by-64" operation. The switching circuit 22 remains switched on for a period of time between the leading edge of the clock signal along lead 26 (Point A) and the leading edge of the pulse input (Point B) at terminal 24 which corresponds to the "lock-in" angle. The counter 30 translates the time the switching circuit remains on, and thus the "lock in" angle is measured by how many cycles of the output from divider 31 gets through the counter 30. A holding register 36 is connected via lead 34 to the counter 30 so that the count may be buffered for subsequent processing. Otherwise stated, an "error signal" developed as a result of the start/stop switching of circuit 22 is translated to a count which is stored in register 36. This count, corresponding to nominal count loaded via line 70 plus or minus an error signal, defines a preset of an up counter 40 which is connected to the holding register 36 via lead 38. The preset determines how many cycles of a pulse signal at terminal 47 get through the counter 40 to generate a series of overflow pulses along output lead 48 (Point D) of counter 40. The signal at terminal 47 is derived from the second clock signal at lead 42 through a frequency divider 44. An output lead 46 connects the output of divider 44 to the terminal 47 of counter 40. Typically, in the gyroscope motor application discussed as an example, the divider 44 may be a divide-by-2 circuit of conventional design. The counter 40 increments from the loaded number until it overflows and generates overflow pulses along lead 48 which connects the output of counter 40 to the input of a counter control/pulse generator 50. The counter control/pulse generator 50 generates an output pulse train along output lead 12 (Point F) having a frequency equal to one half of overflow pulse generation along lead 48. The counter control/pulse generator 50 also synchronizes the operation of circuit 22, counter 30, register 36 and counter 40 as will now be explained.

A "Load" signal is generated at an output lead 52 (Point E) of the counter control/pulse generator 50 for each overflow pulse occurring along lead 48. The purpose of the "Load" signal is to permit the transfer of a held count in register 36 to the up counter 40 to start timing of the next one half cycle of the output frequency.

An additional output of the counter control/pulse generator 50 is present along lead 62 (Point G) and serves as a "Ready" signal for the transfer control circuit 60. In operation of the circuit, there is a single "Ready" pulse for each two overflow pulses during each period of an output signal. This serves to preclude the generation of a D.C. component in the winding of motor 10. Upon reception of "Ready" signals at both inputs of transfer control circuit 60, it generates an "Enable" signal along lead 65 (Point H) which permits the transfer of a count from counter 30 to the holding register 36. An output lead 64, connected in parallel with lead 65 generates a "Clear" signal to the transfer control circuit 56, the "Clear" signal also being necessary for clearing circuit 22 (via lead 66 and input 68) and for completing the transfer of a count from counter 30 to holding register 36. Lead 70 is connected in parallel with lead 64 so that the presence of a "Load" signal on lead 70 causes the loading of an internal preset count in counter 30 for each cycle of the first clock reference signal. The transfer control circuit 56 has a first input 67 connected to the first clock for synchronizing the operation of the transfer control circuit 56. In synchronization with the first clock, the transfer control circuit 56 generates the "Ready" signal at lead 58 (Point I) which is received by the previously mentioned transfer control circuit 60. Upon receipt of both of the "Ready" signals at 58 and 62 (Points G and I), the "Enable" signal 65 is fed to the holding register 36.

In normal operation of the circuitry as shown in FIG. 1, the rotational speed of motor shaft 13 synchronizes to the frequency of the reference furnished by the first clock.

Thus, from the aforementioned discussion of FIG. 1, it will be seen that the detector 16 produces a pulse once per revolution of motor 10. The time at which this pulse occurs is compared to the time of occurrence of the leading edge of the fixed frequency first clock reference. The time difference is incremented in counter 30 with the much higher frequency delivered by divider 31. With each cycle of the fixed frequency, counter 30 is loaded with a preset count in response to a "Load" signal along 70, the preselect load corresponds to nominal motor speed. Counter 30 is then incremented upwardly or downwardly by an amount proportional to the detected time difference generated by circuit 22. The resulting binary number present in counter 30 is transferred for storage in holding register 36, once per cycle of the first clock signal. The stored number is transferred from register 36 to counter 40, as the preset input. Counter 40 thus counts from this preset value to full count to develop the frequency of the output signal from counter control/pulse generator 50 which is proportional to the time difference between the input pulse at terminal 24 and the leading edge of the first clock reference. The output signal along lead 12 drives this positional difference toward a null condition.

Figure 2:
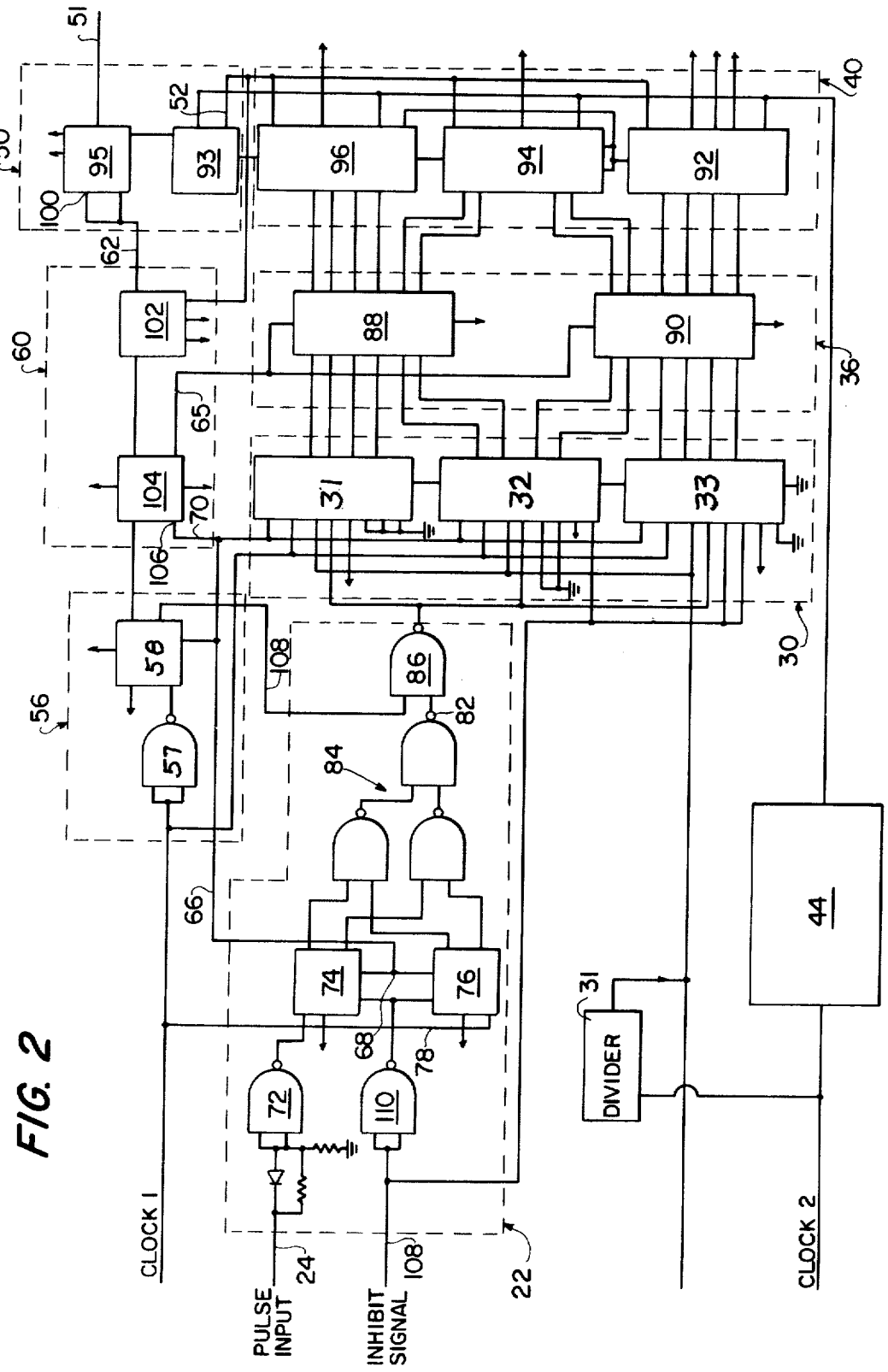
FIG. 2 is a detailed logic diagram of the circuitry shown in block form in FIG. 1.

FIG. 2 of the drawings illustrates the logic of circuit 20. It should be noted that the arrow headed leads to the various circuits indicate connections of unused leads to a common pull-up bias, which may be a 5 volt supply terminal via a voltage dropping resistor. The pulse input at terminal 24 sets a flip-flop 74, via NAND gate 72. The rising edge of the first clock reference squarewave sets flip-flop 76 via lead 78. With both flip-flops 74 and 76 set, the resulting signals pass through the three NAND gates generally indicated by 84. The leading edge of the first clock signal to occur causes NAND gate terminal 82 to go "high" and the pulse input at terminal 24 returns this terminal to the "low" state. The sequence of occurrence of the signals to NAND gates 84 determines whether the output frequency of circuit 20 will be increased or decreased.

The up-down counter 30 is comprised of a number of counter modules 31, 32 and 33, normally fabricated by integrated circuits. Such an integrated circuit is available from many semiconductor manufactures including Motorola, National Semiconductor and Texas Instrument, and designated by the trade standard part number LS669. The counter 30 generates a nominal digital number plus or minus an amount proportional to the error signal presented at terminal 82. The nominal number is loaded into counter 30 at a time following the falling edge of the first clock reference squarewave. The error signal occurs near the rising edge of the first clock reference signal and enables the counter 30 to count "up" or "down" from the value that has been preloaded. The count will be "up" when the first clock reference signal is "high" or whenever the first clock reference sets flip-flop 76 before a pulse occurs at pulse input terminal 24. When the error signal goes "low", the counting stops and the count is held until the next load occurs. The error signal from terminal 82 is provided to counter 30 via a NAND gate 86 which is synchronized to the first clock refrence signal, to prevent lock-in at the wrong edge of the first clock signal.

The output of counter 30 is transferred to latches 88 and 90. These latches may be fabricated in integrated circuit form and are available from the previously mentioned source and are designated by the part number LS174. The transfer of the count to the latches occurs at the same time that the counter 30 is loaded to begin a new cycle of error measurement.

The up counter 40 may consist of a counter chain consisting of three counter components 92, 94 and 96 mounted on an integrated circuit and commercially available through sources such as previously identified and carrying the part number LS163A. Counter 40 is loaded with the count held in the register 36 at a rate of twice the frequency of the output signal appearing along lead 12. The clock to counter 40 is the signal presented at terminal 47 (FIG. 1). The clocking of counter 40 is continuous and is never inhibited. The larger the number loaded into counter 40, the higher the output frequency will be. The counter 40 increments from the preset load, as previously explained, until the counter overflows, at which time a load signal is generated at the output of flip-flop 93 and transmitted along lead 52 to reload counter 40 from the holding register 36.

The output 100 of flip-flop 95 drives interconnected flip-flops 102 and 104 which constitute the transfer control circuit 60. The output 106 of flip-flop 104 is used to synchronize the clearing of flip-flops 74 and 76 as well as the loading of the up-down counter 30 and the transfer of a count to holding register 36. These functions occur the first time output 100 of flip-flop 95 goes "high" following the "high" to "low" transition of the first clock reference signal. The clear, load and transfer functions mentioned occur approximately 180 degrees on the first clock reference waveform from where the error signal is being generated and requires that the output frequency will only change with respect to complete cycles to preclude the generation of a D.C. component in the winding of motor 10.

For completeness of the description of FIG. 2, it should be mentioned that the transfer control circuit 56 is comprised of a NAND gate 57 and a flip-flop 58, the NAND gate is provided on an available integrated circuit carrying the standard designation LS00, available from the previously identified sources.

When an inhibit signal is present along lead 108, the system will be in an initial phase used to turn on power to drive the motor 10 to a value above the synchronizing speed. When the inhibit signal along lead 108 is held "high", the effect of a pulse input at terminal 24 is inhibited and the output frequency is forced to a value slightly higher than the nominal frequency by loading a number larger than nominal into the up-down counter 30. When the signal at lead 108 is "low", the loop between output and input is closed and the motor speed synchronizes to the first clock reference signal.

It should be understood that the invention is not limited to the exact details of construction shown and described herein for obvious modifications will occur to persons skilled in the art.

We claim:

1. A gyroscope motor speed control system comprising:
   a two-axis gyroscope motor having a gyro wheel for sensing tilt about two axes and having a shaft for driving the gyro wheel, said motor being adapted to have a speed which is proportional to the frequency of the input signal;
   detecting means for producing signals in response to cyclical rotation of the motor shaft;
   first counter means for counting during a period of time between the beginning of a clock signal and a detecting means signal whereby the count corresponds to the time period;
   second counter means loaded by the count of the first counter means and incremented therefrom for generating overflow pulses having a frequency proportional to the time period;
   generating means connected in circuit to the output of the second counter means for driving the motor, whereby the time period is urged to a null thus maintaining constant motor speed and phase with respect to a reference;
   register means connected between the first and second counter means for storing the count of the first counter means during a clock cycle and transferring the count to the second counter means at the end of a clock cycle;
   switching means connected between the detecting means and the first counting means for initiating a count therein at the leading edge of the clock signal and terminating the count upon the occurrence of the detecting means signal; and
   transfer means connected to the output of the second counter means for controlling the transfer of the count to the second counter means.

2. The subject matter set forth in claim 1 together with means for loading a preset count into the first counter means for effecting a predetermined nominal frequency of the overflow pulses.

3. The subject matter set forth in claim 2 together with a second clock signal; and
   a plurality of frequency dividing means having the second clock signal at the inputs thereof, the outputs of the frequency dividing means driving the first and second counter means respectively.

4. The subject matter set forth in claim 3 wherein the first counter means is an up/down counter.

5. A gyroscope motor speed control system comprising:
   a two-axis gyroscope motor having a gyroscope motor having a gyro wheel for sensing tilt about two axes and having a shaft for driving the gyro wheel, said motor being adapted to have a speed which is proportional to the frequency of the input signal;
   detecting means for producing signals in response to cyclical rotation of the motor shaft;
   a switching means having inputs respectively connected to a clock signal and the detecting means, the switching means turning on for a time period, in response to a leading edge of the clock signal and turning off in response to the occurrence of the detecting means signal;
   a first counter enabled during the time period for incrementing to a count corresponding to the time period;
   a second counter for generating pulses at the output thereof after the count contained therein causes it to overflow;
   register means connected between the first and second counters for storing the count of the first counter during a clock cycle and for transferring the count to the second counter;

generating means connected to the output of the second counter for generating a pulse signal having the frequency of overflow pulses derived from the second counter;

means connecting the output of the generating means to the motor for decreasing the time period to a null thereby causing the motor to maintain a constant speed and phase with respect to a reference; and transfer control means having an input from the generating means and having respective outputs to the switching means and first counter and second counter for controlling the transfer of signals therebetween.

* * * * *